United States Patent [19]

Schönthaler et al.

[11] Patent Number: 5,101,302
[45] Date of Patent: Mar. 31, 1992

[54] APPARATUS FOR DETECTING MARKS ON A MAGNETIC TAPE WHICH IDENTIFY PARTICULAR ITEMS OF INFORMATION RECORDED THEREON

[75] Inventors: Günter Schönthaler, Miesenbach; Hans Schranz, Vienna, both of Austria

[73] Assignee: U.S. Philips Corporation, New York, N.Y.

[21] Appl. No.: 528,004

[22] Filed: May 22, 1990

[30] Foreign Application Priority Data

May 26, 1989 [AT] Austria .................. 1276-89

[51] Int. Cl.[5] .............................................. G11B 15/18
[52] U.S. Cl. ..................................... 360/72.2; 360/70; 360/71
[58] Field of Search ............... 360/72.2, 72.1, 74.2, 360/74.4, 70, 137, 71

[56] References Cited

U.S. PATENT DOCUMENTS

| | | | |
|---|---|---|---|
| 4,120,006 | 10/1978 | Nagami et al. | 360/72.2 |
| 4,151,566 | 4/1979 | Ohrman | 360/72.1 |
| 4,422,111 | 12/1983 | Moeller et al. | 360/72.2 X |
| 4,692,819 | 9/1987 | Steele | 360/72.1 |
| 4,887,172 | 12/1989 | Steele | 360/72.3 X |

Primary Examiner—John H. Wolff
Attorney, Agent, or Firm—Leroy Eason

[57] ABSTRACT

The information signals recorded on a magnetic tape are accompanied by marks identifying particular items of such information, each mark ($M_1$) comprising at least one marking signal ($S_1$), the tape being driven by a tape-up reel hub (5) during recording. During playback a magnetic head (19) reproduces the recorded signals and a tachometer (46) coupled to the take-up reel hub (5) supplies a tacho-signal which is used by a microprocessor (42) as a reference for frequency comparison with the instantaneous frequency of the reproduced signals. When a predetermined relational condition exists between such frequencies the microprocessor (42) produces a signal indicating the presence of a mark ($M_1$). Since the frequency of the tacho-signal and the frequency of the reproduced signals from the tape are affected in the same way by variations in speed of the take-up reel hub, such variations do not affect accurate detection of the recording marks.

5 Claims, 4 Drawing Sheets

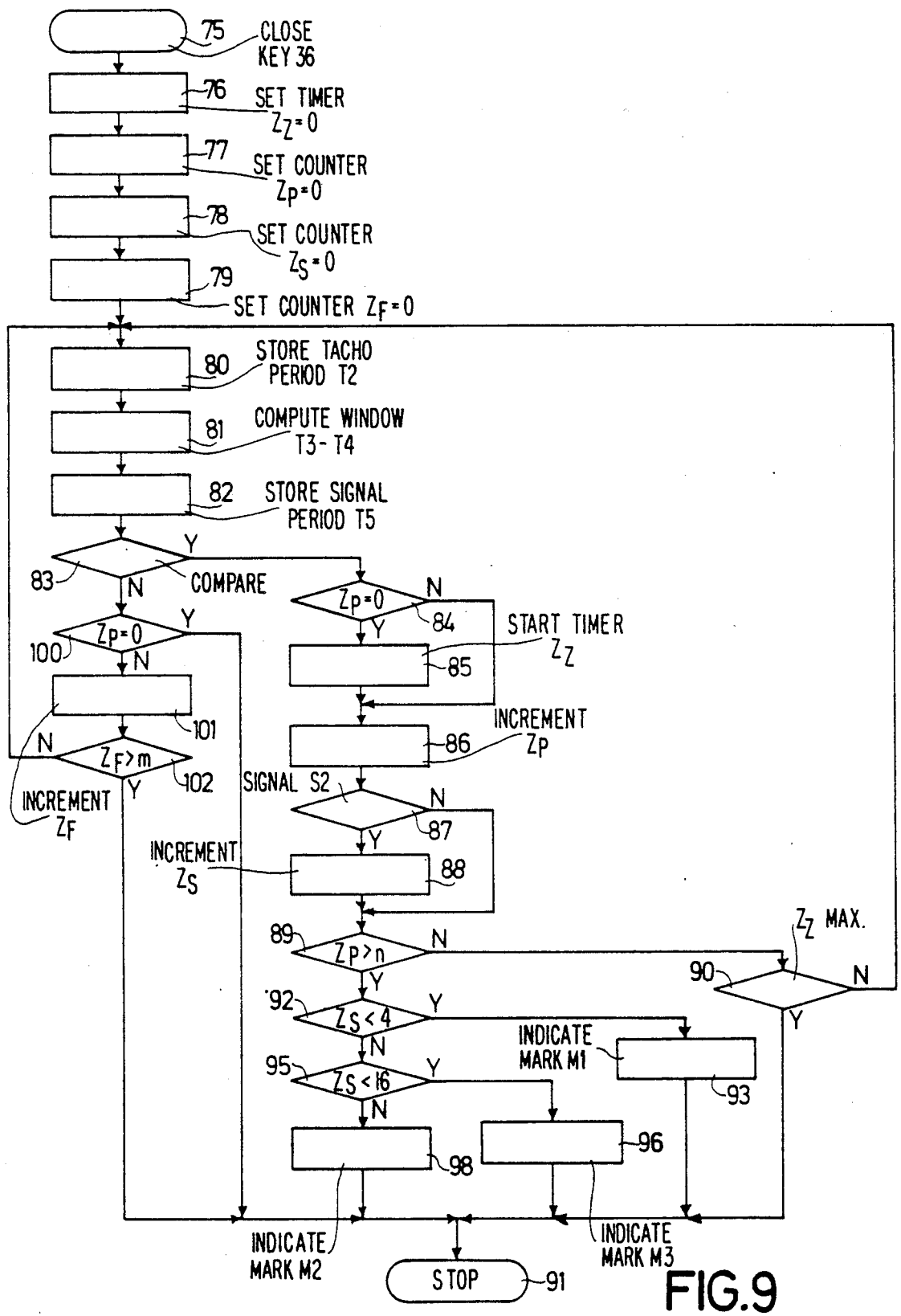

APPARATUS FOR DETECTING MARKS ON A MAGNETIC TAPE WHICH IDENTIFY PARTICULAR ITEMS OF INFORMATION RECORDED THEREON

BACKGROUND OF THE INVENTION

1. Field of the Invention

The invention relates to a system for detecting marks which each comprise at least one marking signal of a given frequency and which together with signals corresponding to information are recorded on a magnetic tape which extends between a supply reel-hub and a take-up reel hub. During recording the tape is driven only via the take-up reel hub which is then driven with a constant rotational speed. The marking signals identify specific items of the recorded information. The system comprises a supply mandril and a take-up mandril for driving the supply reel-hub and the take-up reel hub, at least one magnetic head for reproducing the recorded signals and a frequency-comparison means for comparing the instantaneous frequency of the signals reproduced by the magnetic head with a reference frequency and which when a given relational condition is satisfied supplies a signal indicating the presence of a recording mark.

2. Description of the Related Art

Such a system is known from a commercially available dictation apparatus for magnetic tapes accommodated in cassettes This apparatus enables speech signals dictated by a user to be recorded on a magnetic tape. In addition, the user has the possibility of recording marks on the magnetic tape to identify specific parts of the dictations, for example the end of a dictation or a part of a dictation where a correction of the dictation or an insert in the dictation is required. A mark for identifying the end of a dictation consists of a substantially sinusoidal marking signal having a frequency of 40 Hz, which is recorded on the magnetic tape at the end of the dictation after the speech signals in the same track. A mark which characterizes a part of a dictation to be corrected consists of the substantially sinusoidal marking signal having a frequency of 40 Hz and a further substantially sinusoidal marking signal having a frequency of 1500 Hz, which signals are both recorded on the magnetic tape at the location of the part of the dictation to be corrected by a substitution for the speech signals in the same track. In order to enable these marks and hence the parts of the dictation marked thereby to be detected the known apparatus comprises a system as described in the opening paragraph, the mere presence of a mark being detected by detecting the recorded marking signal having a frequency of 40 Hz contained in all the marks.

During the recording of the dictations and the marks in the known apparatus the magnetic tape is driven only via the take-up reel hub, which is then driven by the take-up mandril at a constant first speed. For detection of the marks the magnetic tape is also driven via the take-up reel hub only, but now the take-up mandril drives this reel-hub at a constant second speed which is twenty times as high as the first speed. As a result of this the speed with which the magnetic tape is driven during detection is twenty times as high as that during recording, enabling the recorded marks to be detected rapidly. During the detection of the marks this twentyfold speed results in a frequency conversion of the recorded marking signals, so that the marking signals reproduced by magnetic heads during detection have a frequency which is twenty times as high. Since both during the recording and during the detection of marks the magnetic tape is driven via the take-up hub, which in each case is driven with a constant speed, this frequency conversion remains the same over the entire length of the magnetic tape. This means that regardless of the location where it has been recorded on the magnetic tape, for example, the recorded marking signal of a frequency of 40 Hz present in all the marks is always reproduced as a frequency-converted marking signal having a frequency of 800 Hz upon detection. In the prior-art system the mere presence of a mark is detected by detecting the occurrence of the frequency-converted reproduced marking signal having a frequency of 800 Hz, for which purpose the known system comprises a frequency comparison circuit in the form of a filter having a fixed mid frequency of 800 Hz, which constitutes the reference frequency relative which the instantaneous frequency of the signals, comprising the speech signals and the marking signals reproduced by means of the magnetic head, are compared. If the frequencies are equal, i.e. if a frequency-converted marking signal having a frequency of 800 Hz is reproduced by means of the magnetic head, the comparison circuit produces an output signal which indicates the presence of a mark and which is employed to control a device for stopping the tape drive. However, if the frequency conversion varies over the entire length of the magnetic tape, which will be the case if during detection of the recorded marks the take-up hub is not driven with a constant speed but with a varying speed or if the supply hub is driven with a constant or variable speed, the marks cannot be detected with the prior-art system comprising a frequency comparison filter circuit having a fixed mid frequency, because in the case of a varying frequency conversion the frequency of the reproduced frequency-converted marking signal changes but the mid frequency of the filter circuit, which forms the reference frequency, remains the same.

SUMMARY OF THE INVENTION

It is an object of the invention to eliminate the above restriction and to provide a system of the type defined in the opening paragraph which by simple means enables the marks to be detected even in the case of a varying frequency conversion of the recorded marking signals. To this end the invention is characterized in that a tachometer is coupled to the take-up mandril to supply a tacho-signal having a frequency proportional to the rotational speed of the take-up mandril, and in that the tacho-signal is applied to the frequency-comparison circuit. The frequency of the tacho-signal forms the reference frequency, the instantaneous frequency of the tacho-signal being compared with the instantaneous frequency of the signals reproduced by means of the magnetic head. In this way it is achieved that during detection of the marks the instantaneous frequency of the signals reproduced by the magnetic head is compared with a reference frequency which corresponds to the instantaneous speed of the take-up hub and so is subjected to the same frequency change as the recorded marking signals regardless of how the magnetic tape is driven. Consequently, the frequency conversion has no effect on the comparison between the two frequencies and so mark detection is independent of the frequency conversion. This means that during detection of the marks the magnetic tape can be driven in any desired way, i.e. for example by also driving the supply hub with a constant or variable speed or by driving the take-up hub with a constant or a variable speed.

In a system in accordance with the invention the frequency comparison means may comprise, for example, two frequency/voltage converters, the tacho-signal being applied to one of said converters and the signals reproduced by the magnetic head being applied to the other converter, which converters supply output voltages which correspond to the frequencies of the signals applied to them and which are processed in a voltage comparator circuit in order to detect the presence of a mark. However, it is found to be advantageous if the frequency comparison means is realized as a microprocessor which, for comparing the instantaneous frequency of the tacho-signal with the instantaneous frequency of the signals reproduced by the magnetic head, determines the instantaneous period of the tacho-signal and the instantaneous period of the reproduced signals and compares such periods in conformity with a predetermined relational condition. If such relational condition is satisfied, the microprocessor supplies a signal indicating the presence of a mark. This results in a very simple and inexpensive construction, and can utilize microprocessor which is provided for also carrying out a plurality of other functions for realizing the frequency-comparison device.

The microprocessor may compare the instantaneous period of the tacho-signal and the instantaneous period of the signals reproduced by the magnetic head directly with each other. However, it is found to be very advantageous if the microprocessor computes a tolerance window having a lower period-limit and an upper period-limit from the detected period of the tacho-signal, and the predetermined relational condition is defined in such a way that the detected instantaneous period of the signals reproduced by the magnetic head will be situated between said two period limits. Such a system has the advantage that it is immune to tolerances of the tacho-generator and tolerances in the frequency of the reproduced marking signals.

In this respect it is also found to be advantageous if the microprocessor only supplies a signal indicating the presence of a mark if the given relational condition for the two periods has been satisfied recurrently. Such a system has the advantage that it is immune to momentary spurious signals which appear in the reproduction signal path of the magnetic head and which have a frequency within the frequency range of the reproduced marking signals.

BRIEF DESCRIPTION OF THE DRAWINGS

Two embodiments of the invention will now be described in more detail, by way of non-limitative examples, with reference to the accompanying drawings wherein:

FIG. 9 is a flow chart of a program carried out in a microprocessor of the apparatus shown in FIG. 8 in order to detect the marks.

DESCRIPTION OF THE PREFERRED EMBODIMENTS

Figure 1:
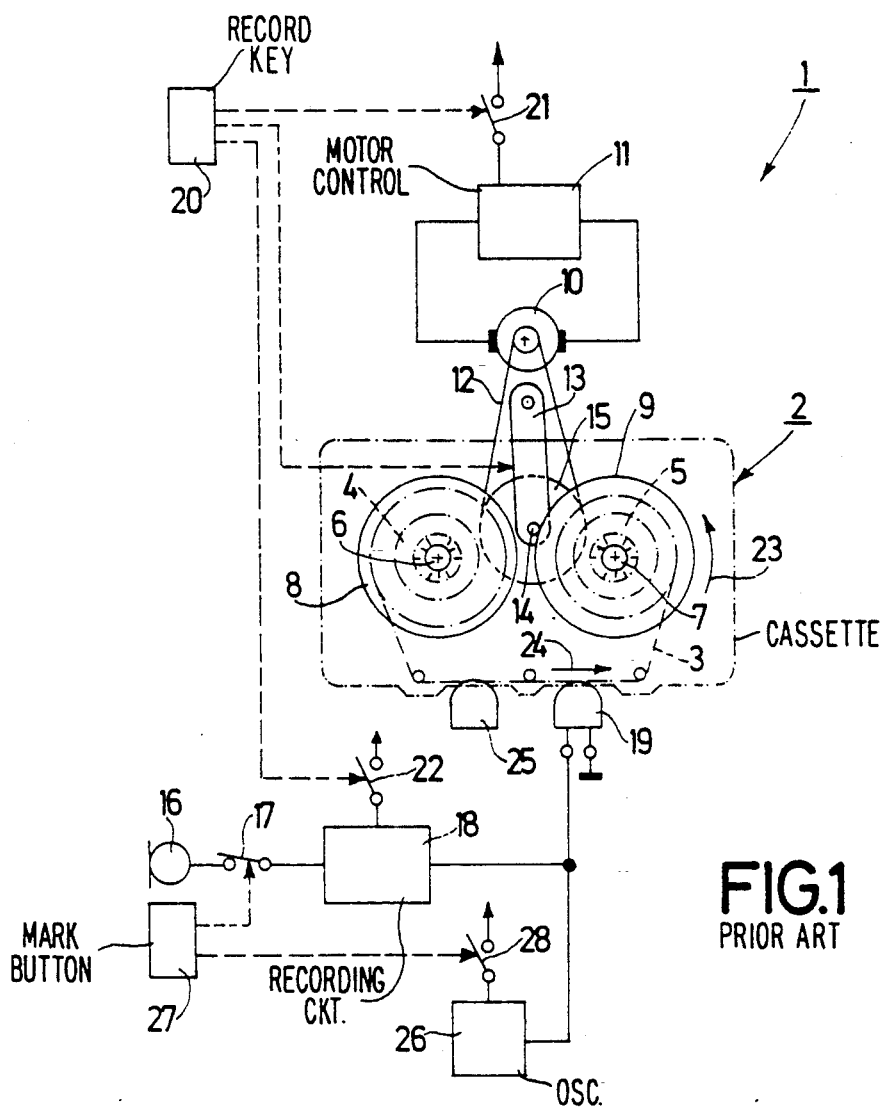
FIG. 1 shows diagrammatically a known form of dictation apparatus for recording dictations and marks comprising a single marking signal of a predetermined frequency on a magnetic tape in a cassette.

FIG. 1 shows diagrammatically a part of a known form of dictation apparatus 1, which is constructed for example as a hand-held pocket dictation machine, for use in conjunction with a magnetic tape 3 accommodated in a cassette 2 which can be loaded into the apparatus, the magnetic tape extending between a supply reel hub 4 and a take-up reel hub 5 in the cassette. In FIG. 1 the cassette 2 is shown diagrammatically in dash-dot lines. The dictation apparatus 1 enables speech signals corresponding to dictations to be recorded on the magnetic tape 3. It also enables marks identifying specific points of the dictations, namely the dictation ends, to be recorded on the magnetic tape 3 together with the speech signals.

In order to drive the supply hub 4 and the take-up hub 5 the apparatus 1 comprises a supply mandril 6 and a take-up mandril 7, which are each coupled to a friction wheel 8 and 9 respectively so as to be rotatable thereby. For driving the friction wheels 8 and 9 there is provided a motor 10, which is energized by means of a control circuit 11, which can also define the direction of rotation and the speed of the motor 10. Such control circuits are known from prior-art dictation machines and are therefore not described in detail because their construction is not relevant to the present invention. By means of a belt 12 the motor 10 drives an idler wheel 15, which is rotatably supported on a pivotable support 13 by means of a spindle 14. The spindle 14 also constitutes a drive shaft for the two friction wheels 8 and 9 with whose circumference the drive shaft 14 is selectively engageable by pivoting the support 13, in order to obtain a non-positive drive.

The apparatus 1 further comprises a built-in microphone 16 to which a recording-signal-processing circuit 18 is connected via a normally closed switch 17, the output of said circuit being connected to a magnetic head 19 by means of which the speech signals corresponding to the dictations can be recorded on the magnetic tape 3 in a "recording" mode. To start the "recording" mode the apparatus 1 comprises a key 20 upon whose actuation, as is shown diagrammatically in broken lines, a switch 21 is closed for energizing the control circuit 11 for the motor 10 and a further switch 22 is closed for energizing the recording-signal-processing circuit 18, and the support 13 with the drive shaft 14 is moved towards the friction wheel 9. When the switch 21 is closed the control circuit 11 is actuated in such a way that by means of the belt 12, the idler wheel 15 and the drive shaft 14, the motor 10 drives the friction wheel 9 and hence the take-up mandril 5 with a predetermined constant first speed in the direction as indicated by an arrow 23 in FIG. 1. When the switch 22 is closed, the recording-signal-processing circuit 18 is activated to process the speech signals received from the microphone 16 via the switch 17 and to apply said signals to the magnetic head 19 in order to record them on the magnetic tape 3, which is driven via the take-up mandril 7, causing the magnetic tape 3 to be moved past the magnetic head 19 in the direction indicated by the arrow 24 and past a magnetic erase head 25, which is in principle constituted by a permanent magnet and which is arranged upstream of the magnetic head 19 in the transport direction of the magnetic tape.

The apparatus 1 further comprises an oscillator 26 which serves to generate a sinusoidal marking signal $S_1$ having a predetermined frequency $f_1$ of 40 Hz. Upon actuation of a marking button 27 a switch 28 is closed, so that the oscillator 26 is turned on for a given time interval $T_1$ of, for example, 600 ms, which oscillator 26 supplies a marking signal $S_1$ to the magnetic head 19, which subsequently records this signal on the magnetic tape 3 as a mark $M_1$. Upon actuation of the marking button 27 the switch 17 is opened to ensure that no speech signal is recorded at the location of the magnetic tape 3 where a mark $M_1$ is to be recorded.

Figure 2:
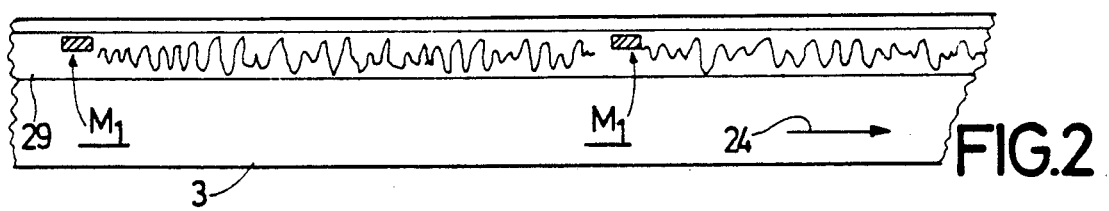
FIG. 2 shows diagrammatically a magnetic tape on which dictations and marks have been recorded by means of an apparatus as shown in FIG. 1.
Figure 3:
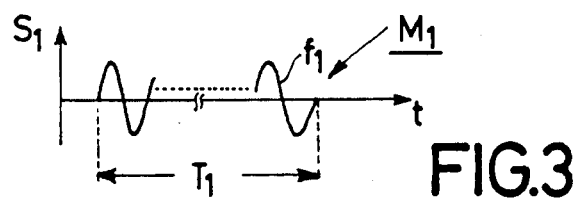
FIG. 3 shows diagrammatically the signal waveform of the marking signal, which forms a mark, as recorded on the magnetic tape shown in FIG. 2.

FIG. 2 shows diagrammatically a part of a magnetic tape 3 on which two dictations are recorded in a track 29, the ends of the dictations each being identified by means of a mark $M_1$. Each of these marks $M_1$ comprises the sinusoidal marking signal $S_1$ having a frequency $f_1$ of 40 Hz and a mark period $T_1$ of 600 ms, as is indicated in FIG. 3. In the present case each mark consequently comprises twenty-four (24) periods of marking signal $S_1$. Here, the marks $M_1$ are recorded in the same track as the speech signals. As is customary in such dictation apparatuses, the recorded speech signals are situated in a frequency range between approximately 200 Hz and 6 kHz, so that the frequency of the 40 Hz marking signal $S_1$ is situated distinctly outside the frequency range of the recorded speech signals. It is to be noted that the marks $M_1$ need not be recorded in the same track as the speech signals but may also be recorded in a separate track.

Figure 4:
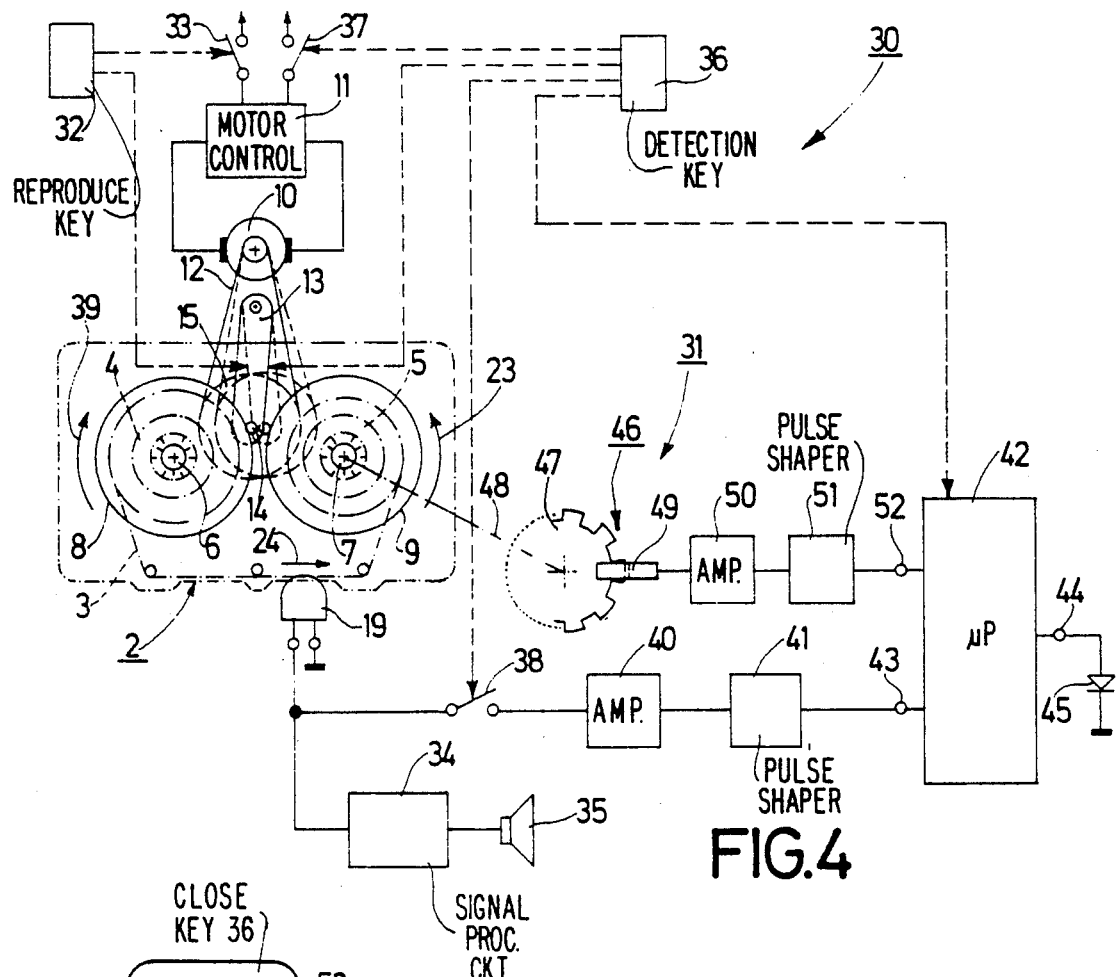
FIG. 4 shows diagrammatically a dictation apparatus comprising a system in accordance with the invention, for the detection of marks recorded by means of the apparatus shown in FIG. 1, and which includes a microprocessor.

FIG. 4 shows diagrammatically a part of a transcription dictation apparatus 30, which is constructed, for example, as a desk-top dictation machine and which serves for reproducing speech signals recorded on the magnetic tape 3, so that these signals can be transcribed. The apparatus 30 comprises a system 31 in accordance with the invention for detecting marks recorded on the magnetic tape 3 by means of an apparatus as shown in FIG. 1. The system 31 for detecting the marks will be described in detail hereinafter.

Similarly to the apparatus shown in FIG. 1 the apparatus 30 comprises a supply mandril 6 and a take-up mandril 7, which are each coupled to a friction wheel 8 and 9 respectively so as to be rotatable thereby. Likewise there is provided a motor 10, which is energized by means of a control circuit 11 and which drives an idler wheel 15 by means of a belt 12, which idler wheel is rotatably mounted on a pivotable support 13 by means of a shaft 14, the shaft 14 constituting a drive shaft for driving the two friction wheels 8 and 9. For reproducing the speech signals and the marking signals in a "reproduction" mode, which signals in the present case are recorded in the same track on the magnetic tape 3, there is provided a magnetic head 19. The apparatus 30 comprises a lead key 32 for starting the "reproduction" mode. Upon actuation of the key 32, as is indicated diagrammatically in broken lines in FIG. 4, a switch 33 for activating the control circuit 11 is closed and the support 13 carrying the drive shaft 14 is moved towards the friction wheel 9. When the switch 33 is closed the control circuit 11 for the motor 10 is activated to energize the motor 10 in such a way that, via the belt 12, the idler wheel 15 and the capstan 14, this motor drives the friction wheel 9 and hence the take-up mandril 7 in the direction indicated by the arrow 23 in FIG. 4 with the same predetermined constant first speed as during recording of the speech signals and marking signals. Thus, in the "reproduction" mode the magnetic tape 3 is also driven only via the take-up mandril 7, which is then driven with the constant first speed, and the take-up reel hub 5, causing the magnetic tape 3 to be moved past the magnetic head 19 in the direction indicated by the arrow 24. The signals scanned by means of the magnetic head 19 are applied to a reproduction-signal-processing circuit 34, which drives a loudspeaker 35 for the acoustic reproduction of the recorded dictations.

As stated above, the apparatus 30 comprises a system 31 for detecting marks $M_1$ recorded on the magnetic tape 3 to enable these marks and hence the dictation end thus marked to be located simply and rapidly. In order to start a "detection" mode the apparatus 30 comprises a key 36. When the key 36 is actuated, as is indicated diagrammatically by broken lines in FIG. 4, a switch 37 and a switch 38 are closed and the support 13 carrying the drive shaft 14 is moved towards the friction wheel 8. As a result of the closure of the switch 37 the control circuit 11 for the motor 10 is activated to energize the motor 10 in such a way that this motor drives the friction wheel 8 via the belt 12, the idler wheel 15, the drive shaft 14 and hence the supply mandril 6 in the indicated direction with a given constant second speed which is twenty times as high as the first speed with which the take-up mandril 7 is driven during recording and reproduction. In this way the magnetic tape 3 is driven only via the supply mandril 6 and the supply hub 4 during the detection of marks, so that during mark detection the magnetic tape 3 is moved past the magnetic head 19 in a direction opposite to that during recording of the marks, i.e. opposite to the direction indicated by the arrow 24, the speed of the magnetic tape 3 during the detection of the marks being higher than during recording because the speed of the supply mandril 6 is twenty times as high. The speed of the magnetic tape 3 during the detection of the marks increases as the tape-roll diameter on the supply hub 4 increases, whereas during the recording of the marks the speed of the magnetic tape increases as the tape-roll diameter on the take-up hub 5 increases. The fact that the speed of the magnetic tape during the detection of the marks is higher than the speed during the recording of the marks results in a frequency change of the recorded marking signals during detection, the oppositely directed increase in speed of the magnetic tape during detection of the marks in comparison with the speed increase during the recording of the marks causing said frequency change to vary over the entire length of the magnetic tape. For example, on account of the varying frequency change the marking signals $S_1$ of a frequency of 40 Hz which are recorded on the magnetic tape will be reproduced as frequency-converted marking signals in a frequency range of 300 Hz to 2000 Hz during detection. It is to be noted that for the detection of the marks the magnetic tape 3 can also be driven via the take-up mandril 7, which is then for example also driven with a speed which is twenty times as high as during recording. This also gives rise to a frequency change of the reproduced marking signals, but this change remains constant over the entire length of the magnetic tape.

As already stated, the switch 38 is closed upon actuation of the key 36. As a result of this the signals reproduced from the magnetic tape 3 by means of the magnetic head 19, in the present case speech signals and marking signals, are applied to an amplifier stage 40. The output signals of the amplifier stage 40 are applied to a pulse shaper 41, which supplies pulse-shaped output signals which are applied to an input 43 of a frequency-comparison device 42. In the present case the frequency-comparison device 42 is advantageously realized by means of a microprocessor which performs several functions in the apparatus, which will not be described because they are not relevant to the present invention. In the present case the microprocessor 42 serves as a frequency-comparison device for comparing the instantaneous frequency of the frequency-converted signals, reproduced by the magnetic head 19 and applied to the input 43 as pulse-shaped signals, with a reference frequency signal supplied to the input 52, the microprocessor 42 supplying to its output 44 a signal indicating the presence of a mark when a given relational condition is satisfied. This signal on the output 44, for example, turns on a light-emitting diode 45 for a given time interval so that the detection of a mark is indicated optically. However, the signal on the output 44 may also be indicated acoustically or may be applied to the control circuit 11 for the motor 10, the control circuit 11 switching off the power supply to the motor 10 when said signal appears, so that the motor 10 stops and the transport of the magnetic tape 3 stops when a mark is detected.

The system 31 for detecting the marks $M_1$ also comprises a tachometer 46. The tachometer 46 comprises a toothed disc 47, which is suitably connected directly to the take-up mandril 7. However, as is indicated by a dash-dot line in FIG. 1, the disc 47 may also be coupled to the take-up mandril 7 via a transmission 48, for example a belt. The teeth of the toothed disc 47 cooperate with a symbolically shown photoelectric sensor 49 of the tachometer 46. As the disc 47 is driven its teeth periodically interrupt a light beam in the sensor 49, so that it supplies a periodic tacho-signal whose frequency is proportional to the speed of the take-up mandril 6 and hence of the take-up reel hub 5. The tachometer 46 is constructed in such a way that if the motor 10 drives the take-up mandril 7 with the given first speed, as is the case during recording, the tachometer supplies a tacho-signal of a given frequency $f_G$, which is in a predetermined ratio to the frequency $f_1$ of 40 Hz of the marking signal $S_1$. Thus, the equation $f_G = k \cdot f_1$ is satisfied, where k is a specific factor. In practice the frequency $f_G$ may be, for example, 20 Hz, so that the factor k is then 0.5 because the frequency $f_1$ of the marking signal $S_1$ is 40 Hz. Instead of a photoelectric tachometer it is possible to employ a tachometer which operates capacitively, inductively or in any other way.

Since the tachometer 46 is coupled to the take-up mandril 7 which during recording of the marks $M_1$ is driven with the constant first speed by the motor 10, the frequency of the tacho-signal generated by means of the tachometer 46 will be subjected to the same frequency change as that to which the signal reproduced by the magnetic head 19, i.e. the marking signals $S_1$, are subjected when the supply mandril 6 is driven by the motor 10, as is the case during the detection of the marks $M_1$ in the present apparatus 30. Consequently, if during detection the frequency-converted signals reproduced by the magnetic head 19 are compared in frequency with the frequency-converted tacho-signals from the tachometer 46 the similar frequency changes to which both frequency-converted signals are subjected will have no effect on the frequency comparison. The frequency comparison between these two frequency-converted signals is therefore independent of the frequency conversion to which said signals have been subjected. Employing the recognition of this fact, the tacho-signal, in the form of a pulse-shaped signal, is applied from the tachometer 46, which is coupled to the take-up mandril 7, via an amplifier 50 and a pulse shaper 51, to a further input 52 of the microprocessor 42 forming the frequency-comparison device. In the microprocessor 42 the instantaneous frequency of the frequency-converted tacho-signal now forms the reference frequency and the microprocessor 42 compares this reference frequency with the instantaneous frequency of the signals reproduced by means of the magnetic head 17, i.e. the frequency-converted speech signals and the frequency-converted marking signals whose frequency is always situated outside the frequency range of the frequency-converted speech signals.

Figure 5:
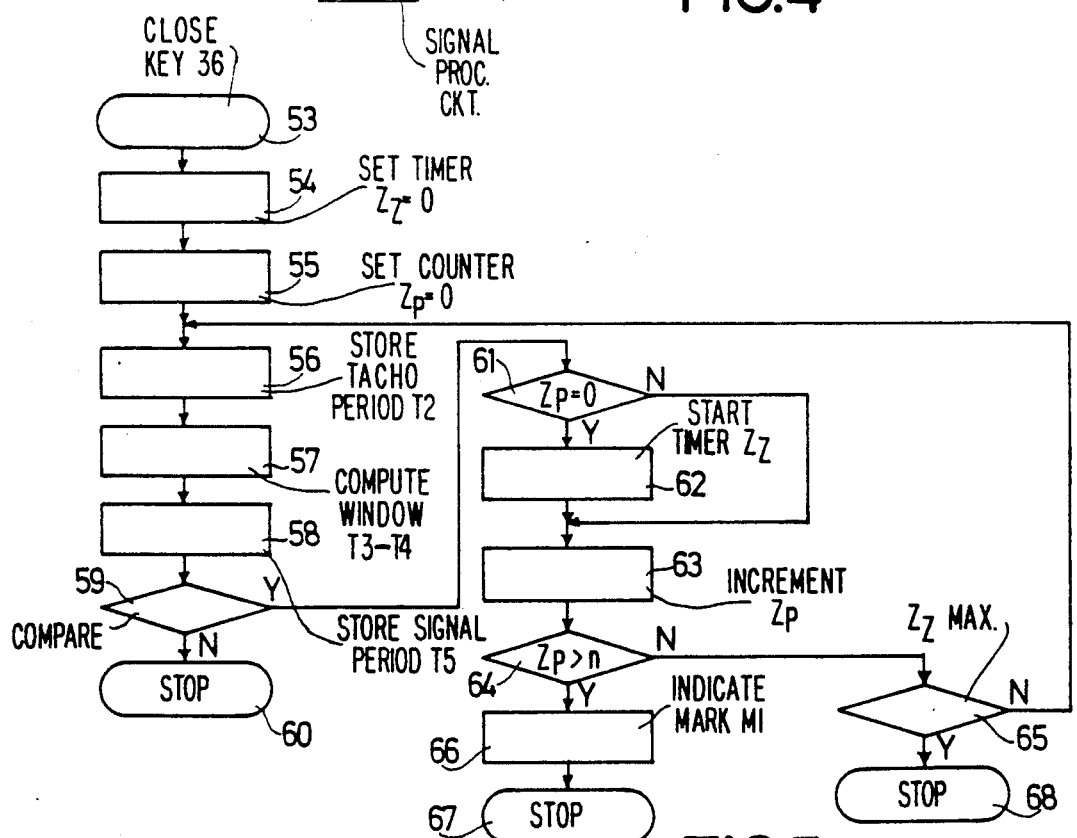
FIG. 5 is a flow chart of a program carried out in the microprocessor of the apparatus shown in FIG. 4 in order to detect the marks.

A program carried out by the microprocessor 42 to detect the marks in the "detection" mode will now be described with reference to FIG. 5. The start of the "detection" mode is reported to the microprocessor 42 when the key 36 for starting the "detection" mode is actuated, as is indicated in broken lines in FIG. 4.

After the start of the "detection" mode the program is started in block 53. In the next block 54 an internal timer $Z_Z$ is set to zero. In the next block 55 a period counter $Z_p$ is set to zero. After this, in block 56, the instantaneous length $T_2$ of one period of the pulse-shaped frequency-converted tacho signal, supplied to the input 52 of the microprocessor 42 by the tachometer 46, is determined and is stored in a register $R_1$. Subsequently, in block 57 a tolerance window having an upper period limit $T_3$ and a lower period limit $T_4$ is computed from the detected instantaneous period $T_2$ of the frequency-converted tacho signal. The upper period limit $T_3$ is then computed, for example, in accordance with the equation $T_3 = k \cdot T_2 \cdot 1.1$ and the lower period $T_4$ is computed, for example, in accordance with the equation $T_4 = k \cdot T_2 \cdot 0.9$, the upper period limit $T_3$ being stored in a register $R_2$ and the lower limit $T_4$ in a register $R_3$. The factor k is dictated by a frequency ratio $f_G : f_1$, as described above. Subsequently, in block 58 the instantaneous length $T_5$ of a period of the frequency-converted signals reproduced by the magnetic head 19 and applied to the input 43 of the microprocessor 42 is determined and is stored in a register $R_4$.

After this, in block 59, the two instantaneous periods $T_2$ and $T_5$ thus determined are compared in conformity with a relational condition for the two periods. This predetermined relational condition is defined in the microprocessor 42 in such a way that the detected instantaneous period $T_5$ of the signals reproduced by means of the magnetic head 19 should be situated between the two period limits $T_3$ and $T_4$ computed from the detected instantaneous period $T_2$ of the tacho-signal. Consequently, the relational condition $k.T_2.0.9 < T_5 < k.T_2.1$ should be satisfied in the present case. The tolerance window ensures a detection which is immune to tolerances of the tachometer and tolerances of the frequency of the reproduced frequency-converted marking signals. If said relational condition is not satisfied, i.e. if the magnetic head 19 reproduces a speech signal having a period which differs from the period of the marking signal, or if this magnetic head does not reproduce any signal or only noise signals, this program sequence is terminated in block 60.

However, if in block 59 the relational condition is satisfied, i.e. when for the first time a period of a frequency-converted reproduced marking signal $S_1$ is detected, it is ascertained in block 61 whether the count of the period counter $Z_p$ is zero. If it is zero the internal timer $Z_Z$ is started in block 62 and is subsequently incremented automatically as the time elapses. After the block 62 the program continues in block 63, which is also the case if in block 61 it is found that the count of the period counter $Z_p$ is not zero. This means that the timer $Z_Z$ will be started only if the count of the period counter $Z_p$ is zero, i.e. after a period of a frequency-converted reproduced marking signal $S_1$ has been detected for the first time. In the block 63 the period counter $Z_p$ is incremented. The period counter $Z_p$ thus counts how many times the detected instantaneous periods $T_2$ and $T_5$ satisfy the relational condition verified in block 59, or in other words how many periods of a frequency-converted reproduced marking signal $S_1$ have been detected. In the next block 64 it is ascertained whether the count of the period counter $Z_p$ is greater than a given value n. In the present case the value n is selected to be, for example, $n=b\ 20$. This means that the relational condition should be satisfied for at least twenty (20) periods of the twenty-four (24) recorded periods of a marking signal $S_1$. In this way the detection process becomes immune to momentary spurious signals which appear on the input 43 of the microprocessor 42 and whose frequency is situated within the frequency range of the frequency-converted reproduced marking signals, which spurious signals may therefore simulate a mark. As long as the value n is not greater than twenty (20), it is checked in the block 65 whether the count of the timer $Z_Z$ has at least a value corresponding to the greatest possible length of a frequency-converted reproduced marking signal $S_1$. If this is not the case, the program proceeds in the block 56 and may continue up to block 64.

If it is found in block 64 that the count of the period counter $Z_p$ is greater than the predetermined value n, which means that the relational condition verified in block 59 has been satisfied at least twenty times, i.e. at least twenty periods of a frequency-converted reproduced marking signal $S_1$ have been detected, the program is continued in block 66. In block 66 the microprocessor 42 produces a signal indicating the presence of a mark $M_1$ on the output 44 for a given time $T_6$, which signal causes the light-emitting diode 45 to be turned on for said time interval $T_6$ to give an indication to the user that a mark $M_1$ has been detected. In block 66 the microprocessor 42 can also internally store a digital identification value for a mark together with a digital position value, corresponding to the count of a length-of-tape counter upon detection of the mark, at a specific storage location, the identification value together with the position value indicating the presence of a mark on the magnetic tape at the location specified by the count of the length-of-tape counter. Subsequently, the program is terminated in block 67.

If it is found in block 65 that the count of the timer $Z_Z$ has already reached a value corresponding at least to the maximal length of a frequency-converted reproduced marking signal $S_2$, although it has been found previously in block 64 that the relational condition verified in block 59 has not been satisfied frequently enough, no mark is present and the program is discontinued in block 68.

Figure 6:
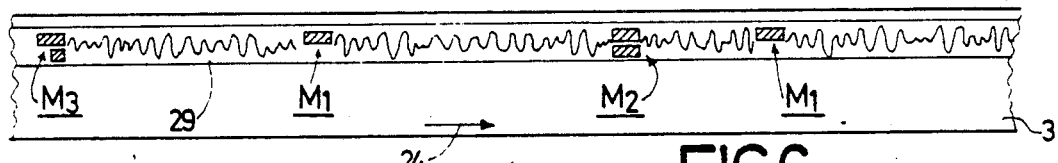
FIG. 6 shows diagrammatically a magnetic tape on which dictations and three different marks have been recorded by means of an apparatus, not shown, of a construction similar to the apparatus shown in FIG. 1.

FIG. 6 shows a magnetic tape 3, on which three dictations and three different symbolically represented marks $M_1$, $M_2$ and $M_3$ have been recorded in a track 29. Each mark $M_1$ identifies the end of a dictation to be transcribed without priority. Each mark $M_2$ identifies a part of a dictation to be corrected during transcription. Each mark $M_3$ identifies the end of a dictation to be transcribed with priority.

Figure 7:
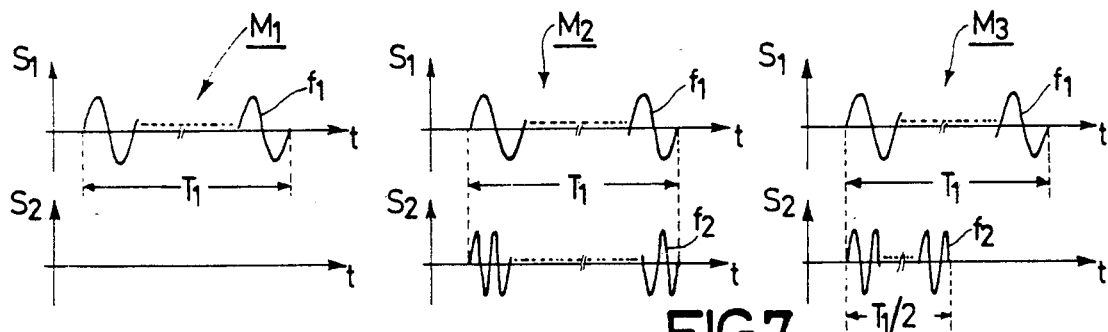
FIG. 7 shows diagrammatically the signal composition of the three different marks recorded on the magnetic tape shown in FIG. 6.

As is shown diagrammatically in FIG. 7, each mark $M_1$, as is also apparent from FIG. 3, only comprises a first sinusoidal marking signal $S_1$ having a frequency $f_1$ of 40 Hz and a period $T_1$ of 600 ms. Every mark $M_1$ comprises the first sinusoidal marking signal $S_1$ having a frequency $f_1$ of 40 Hz and a period $T_1$ of 600 ms and a second sinusoidal marking signal $S_2$ having a frequency $f_2$ of 1500 Hz and a period $T_1$ of 600 ms. Every mark $M_3$ is made up of the first sinusoidal marking signal $S_1$ having a frequency $f_1$ of 40 Hz and a period $T_1$ of 600 ms and the second sinusoidal marking signal $S_2$ having a frequency $f_2$ of 1500 Hz and a period $T_1/2$ of 300 ms.

Figure 8:
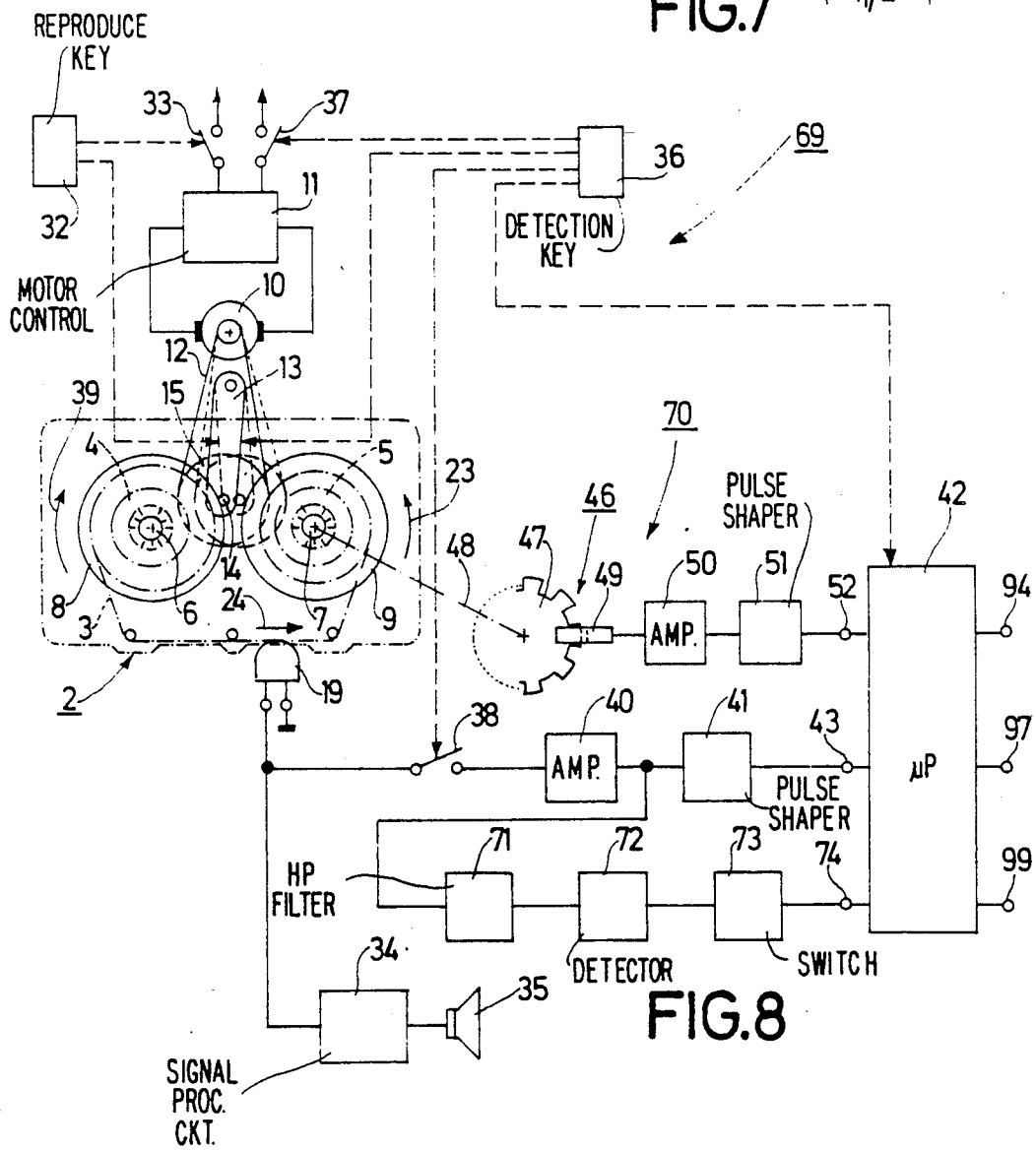
FIG. 8 shows a dictation apparatus comprising another system in accordance with the invention, for detecting three different marks as illustrated in FIG. 7, and which includes a microprocessor.

FIG. 8 shows an apparatus 69 comprising a system 70 for detecting the three above marks $M_1$, $M_2$ and $M_3$. In the apparatus 69 the pulse shaper 41 connected to the output of the amplifier stage 40 is constructed as a Schmitt-trigger having an upper limit frequency of approximately 2.5 kHz, so that only the frequency-converted reproduced marking signals which correspond to the recorded marking signals $S_1$ having a frequency of 40 Hz and whose frequencies are always below 2.5 kHz are applied to the input 43 of the microprocessor 42. Moreover, a high-pass filter 71 is connected to the output of the amplifier stage 40, which filter has a lower cut-off frequency of approximately 10 kHz, so that this high-pass filter rejects the frequency-converted reproduced marking signals corresponding to the recorded marking signals $S_1$ and having a frequency of 40 Hz but transmits all the other frequency-converted reproduced signals, i.e. also the frequency-converted reproduced marking signals corresponding to the recorded marking signals $S_2$ having a frequency of 1500 Hz. An amplitude detector 72 constructed as a rectifier is connected to the high-pass filter 71 and is followed by a threshold switch 72, whose output is connected to a further input 74 of the microprocessor 42.

Hereinafter a program sequence carried out in the microprocessor 42 of the apparatus 69 shown in FIG. 8 in the "detection" mode is described with reference to FIG. 9. After the start of the "detection" mode, which is reported to the microprocessor when the key 36 is actuated, the program sequence given in FIG. 9 is started in block 75. In the next block 76 an internal timer $Z_Z$ is set to zero. In the next block 77 the period counter $Z_p$ is set to zero. In the subsequent block 78 a further counter $Z_S$ is set to zero. In the next block 79 a further period counter $Z_F$ is set to zero. In the following block 80, in the same way as in the block 56 in FIG. 5, the instantaneous length $T_2$ of a period of the pulse-shaped frequency-converted tacho-signal supplied by the tachometer 46 to the input 52 of the microprocessor 42 is determined and is stored in a register $R_1$. Subsequently, in block 81, in the same way as in block 57 in FIG. 5, a tolerance window having an upper period-limit $T_3$ and a lower period-limit $T_4$ is computed from the detected instantaneous period $T_2$ of the frequency-converted tacho-signal, the upper period-limit $T_3$ being stored in a register $R_2$ and the lower period-limit $T_4$ being stored in a register $R_3$. Subsequently, in block 82, in the same way as in block 58 in FIG. 5, the instantaneous length $T_5$ of a period of the frequency-converted signals, reproduced by means of the magnetic head and applied to the input 43 of the microprocessor 42, is determined and is stored in a register $R_4$. After this, in block 83, in the same way as in block 59 in FIG. 5, the detected instantaneous periods $T_2$ and $T_5$ are compared with each other in accordance with the relational condition $k.T_2.0.9 < T_5 < k.T_2.1.1$.

If the relational condition verified in block 83 is satisfied, i.e. if for the first time a period of a frequency-converted reproduced marking signal $S_1$ is detected, it is checked in block 84 whether the count of the period counter $Z_p$ is zero. If this is the case the internal timer $Z_Z$ is started in block 85, which is subsequently incremented automatically in accordance with the elapsed time. After the block 85 the program is continued in block 86, which is also the case if it is found in block 84 that the count of the period counter $Z_p$ is not zero. This means that the timer $Z_Z$ is started only if the count in the period counter $Z_p$ is zero, i.e. only after a period of a frequency-converted reproduced marking signal $S_1$ is detected for the first time. In this way the period counter $Z_p$ counts how many periods of a frequency-converted reproduced marking signal $S_1$ are detected. In the next block 87 it is checked whether a signal appears on the input 74 of the microprocessor 42. This means that it is checked whether during the occurrence of a period of the frequency-converted reproduced marking signal $S_1$ also a frequency-converted reproduced marking signal $S_2$ appears. If this is the case, the further counter $Z_S$ is subsequently incremented in the block 88. This means that the counter $Z_S$ detects the number of periods of the frequency-converted reproduced marking signal $S_1$ during which also a frequency-converted reproduced marking signal $S_2$ appears. After the block 88 the program proceeds in the block 89, which is also the case if the test in the block 87 is negative, i.e. if no signal appears on the input 74 of the microprocessor 42. In block 89 it is checked whether the count of the period counter $Z_p$ is greater than a given value n, the value n again being selected to be n=20, in the same way as in block 64 in FIG. 5. As long as the value n is not greater than twenty (20) it is checked in block 90, in the same way as in block 65 in FIG. 5, whether the count of the timer $Z_Z$ has at least a value which corresponds to the maximal length of a frequency-transposed reproduced marking signal $S_1$. If this is the case, although previously in block 89 it has been found that the relational condition verified in block 83 is not yet satisfied frequently enough, no mark is present and the program is discontinued in block 91. However, if the test in block 90 is negative the program is continued in block 80 and is repeated starting in block 80.

If in block 89 the count of the period counter $Z_p$ is found to be greater than n=20 it is subsequently checked in block 92 whether the count of the further counter $Z_S$ is smaller than 4, i.e. whether a frequency-converted reproduced marking signal $S_2$ has appeared during less than four, in particular zero, periods of the frequency-converted reproduced marking signal $S_1$. If this is the case a mark $M_1$ is present and in block 93 the microprocessor 42 produces a signal indicating the presence of a mark M1 on its output 94 for a predetermined time interval $T_6$, which signal for example causes a light-emitting diode connected to the output 94 to light up. After the block 93 this program sequence is terminated in block 91.

If the check carried out in block 92 appears to be negative it is ascertained in block 95 whether the count of the further counter $Z_S$ is smaller than the value 16, i.e. whether during at least four and at the most fifteen periods of the frequency-converted reproduced marking signal $S_1$ also a frequency-converted reproduced marking signal $S_2$ has appeared on the input 74 of the microprocessor 42. If this is the case a mark $M_3$ is present and in block 96 the microprocessor 42 produces on its output 97 a signal indicating the presence of a mark $M_3$ for a predetermined time interval $T_6$, which signal for example causes a light-emitting diode connected to the output 97 to light up. After the block 96 the program sequence is discontinued in block 91.

If in block 83 it is found that the relational condition $k.T_2.0.9 < T_5 < k.T_2.1.1$ is not satisfied for the two detected instantaneous periods $T_2$ and $T_5$, the program proceeds with block 100. In block 100 it is ascertained whether the count of the period counter $Z_p$ is zero. If this is the case, i.e. if the count of the period counter $Z_p$ is zero, which means that prior to this no period of a frequency-converted reproduced marking signal $S_1$ has been detected, the program is discontinued in block 91. However, if the count of the period counter $Z_p$ is not zero, i.e. if previously at least one period of a frequency-converted reproduced marking signal $S_1$ has been detected, the program is continued in block 101. In block 101 the further period counter $Z_F$ is incremented. This means that the further period $Z_F$ counts how many times the relational condition verified in block 83 is not satisfied for the two instantaneous periods $T_2$ and $T_5$ if this condition has already been satisfied at least once before. After this, in block 102, it is ascertained whether the count of the period counter $Z_F$ is greater than a predetermined value m. The value m is, for example, selected to be m=4. If this is not the case, the program proceeds with block 80. Thus, during the detection of a mark the relational condition may not have been satisfied four times as a result of spurious signals and nevertheless the detection process for this mark is continued. If the count of the further period counter $Z_F$, however, is greater than the value m it may be assumed that no mark is present and the program sequence is discontinued in block 91.

Both in the embodiment of the system shown in FIG. 4 and in the embodiment of the system shown in FIG. 8 the occurrence of a mark $M_1$, $M_2$ or $M_3$ is, in principle, detected by frequency comparison of the instantaneous frequency of the frequency-converted marking signal, corresponding to the recorded marking signal $S_1$ having a frequency of 40 Hz, with the instantaneous frequency of the frequency-converted tacho-signal supplied by the tachometer 46, which frequency comparison has the advantage that it is independent of the frequency conversion because both the marking signals and the tacho-signal are subjected to the same frequency conversion. This has the advantage that during the detection of the marks the magnetic tape may be driven in any desired manner, i.e. both by driving the supply hub and by driving the take-up hub. In order to identify the marks which differ from one another by the length of the marking signal $S_2$ having a frequency of 1500 Hz, the embodiment of the system shown in FIG. 8 detects the actual appearance and the length of time of the frequency-converted reproduced marking signal corresponding to the recorded marking signal $S_2$ having a frequency of 1500 Hz in relation to the length of the frequency-converted reproduced marking signal corresponding to the recorded marking signal $S_1$ having a frequency of 40 Hz. Detection of the appearance of a frequency-converted reproduced marking signal $S_2$ is then effected by means of an amplitude detector constituted by a rectified stage. Obviously, the occurrence of a frequency-converted reproduced marking signal $S_2$ can also be detected, in the same way as for the frequency-converted reproduced marking signal $S_1$, by frequency comparison between the instantaneous frequency of the frequency-converted reproduced marking signal $S_2$ and the instantaneous frequency of the frequency-converted tacho-signal supplied by the tachometer.

We claim:

1. Apparatus for detecting marks on a magnetic tape which identify recorded information signals thereon corresponding to particular items of information, each recording mark comprising at least one marking signal of a given frequency, the magnetic tape extending between a supply reel-hub and a take-up reel hub and being driven during recording by the take-up reel hub and being driven during recording by the take-up reel hub at a constant rotational speed, the supply and take-up reel hubs having respective drive mandrels, the apparatus including at least one magnetic head for reproducing the recorded signals on the magnetic tape; characterized in the said apparatus further comprises:

frequency-comparison means coupled to said magnetic head for comparing the instantaneous frequency of the signals reproduced thereby with a reference frequency and for supplying a signal signifying the presence of a mark on the magnetic tape when a predetermined relational condition exists between said reference frequency and the frequency of the reproduced signals; and a tachometer coupled to the take-up reel mandrel for supplying to said frequency-comparison means a tacho-signal having a frequency proportional to the rotational speed of the take-up reel mandrel, the frequency of the tacho-signal constituting said reference frequency for said frequency-comparison means;

whereby determination of whether said predetermined relational condition is satisfied is independent of variations in the rotational speed of the take-up reel mandrel.

2. Mark detection apparatus as claimed in claim 1, wherein said frequency-comparison means comprises a microprocessor which, for comparing the instantaneous frequency of the tacho-signal with the instantaneous frequency of the signals reproduced by the magnetic head, is adapted to determine the instantaneous period of the tacho-signal and the instantaneous period of the reproduced signals and to compare such determined periods in accordance with said predetermined relational condition, and if such condition is satisfied to produce a signal signifying the presence of a mark on the tape.

3. Recording apparatus as claimed in claim 2, wherein the microprocessor is adapted to formulate a tolerance window defining a lower limit and an upper limit of the period of the tacho-signal, and to determine whether the predetermined relational condition is satisfied by determining whether the detected instantaneous period of the signals reproduced by the magnetic head is within said tolerance window.

4. Recording apparatus as claimed in claim 3, wherein the microprocessor is adapted to supply a signal indicating the presence of a mark only if said predetermined relational condition has been satisfied recurrently.

5. Recording apparatus as claimed in claim 2, wherein the microprocessor is adapted to supply a signal indicating the presence of a mark only if said predetermined relational condition has been satisfied recurrently.

* * * * *